No. 662,238. Patented Nov. 20, 1900.
A. O. LOMBARD.
PULP WOOD CHIPPER.
(Application filed July 3, 1899.)
(No Model.) 2 Sheets—Sheet 1.

WITNESSES: INVENTOR.
Jas. J. Maloney. Alvin O. Lombard,
Nancy P. Ford. BY J. P. and H. J. Livermore,
ATTORNEY.

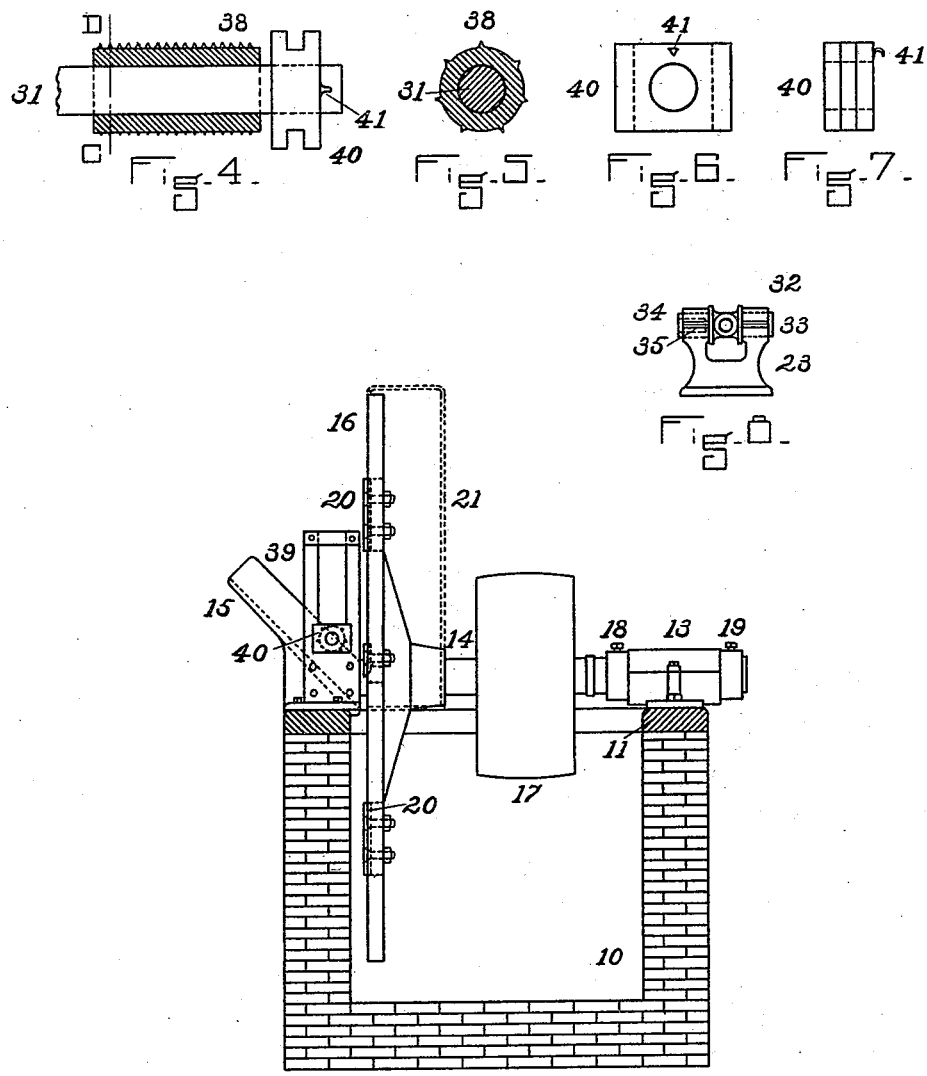

United States Patent Office.

ALVIN O. LOMBARD, OF WATERVILLE, MAINE, ASSIGNOR TO THE BURGESS SULPHITE FIBRE COMPANY, OF MAINE.

PULP-WOOD CHIPPER.

SPECIFICATION forming part of Letters Patent No. 662,238, dated November 20, 1900.

Application filed July 3, 1899. Serial No. 722,632. (No model.)

*To all whom it may concern:*

Be it known that I, ALVIN O. LOMBARD, of Waterville, county of Kennebec, and State of Maine, have invented an Improvement in Pulp-Wood Chippers, of which the following description, in connection with the accompanying drawings, is a specification, like characters on the drawings representing like parts.

My invention relates to a pulp-wood chipper designed for the cutting of chips to be used in the manufacture of wood-pulp in paper-making processes.

It has for its object the application of a feeding mechanism to an ordinary chipper, whereby the logs may be fed to the knives in a regular manner, so that the thickness of the chips will be substantially the same, thereby saving much waste and improving the quality of the paper stock or pulp.

Figure 2:
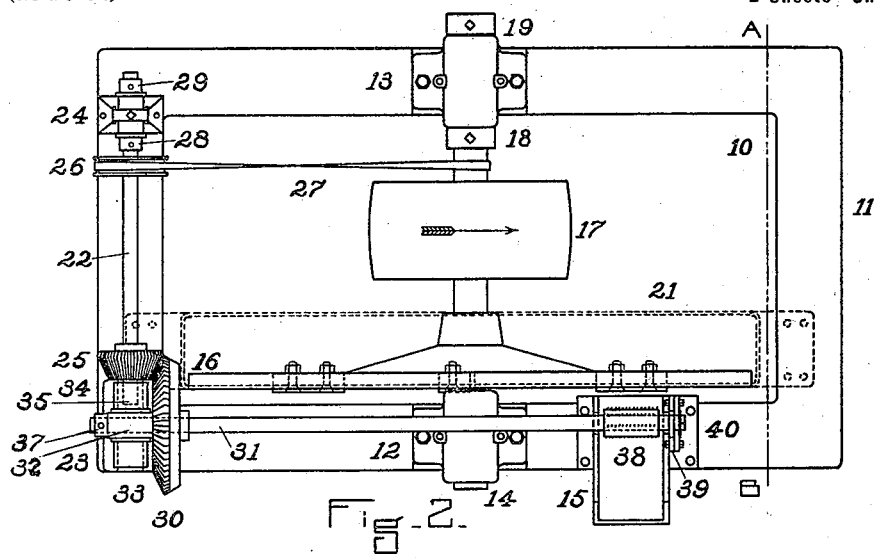
Figure 1:
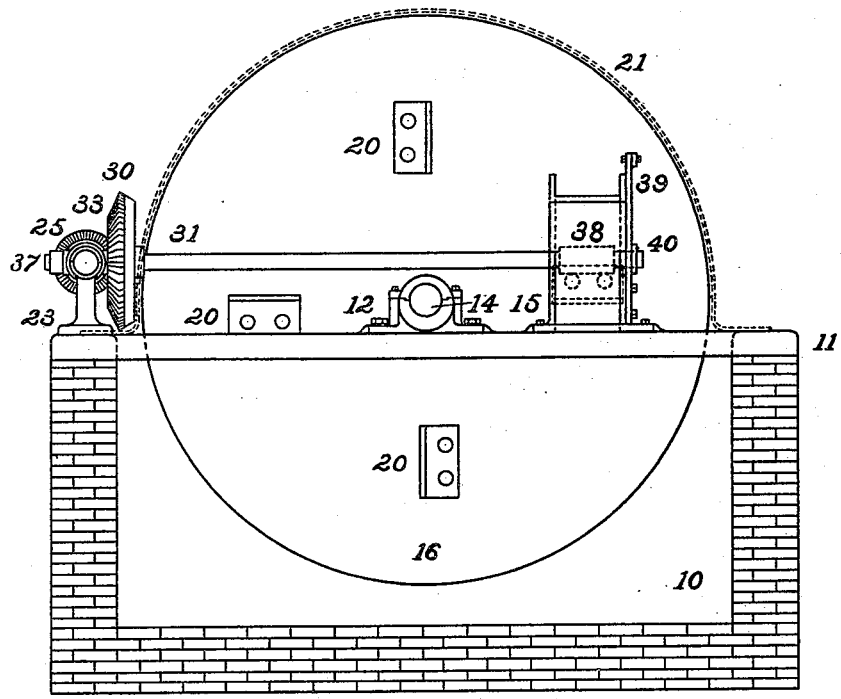

Figure 1 represents the chipper in front elevation, the pit being shown in section. Fig. 2 is a plan of Fig. 1. Fig. 3 is a sectional view of Fig. 2 on line A B. Fig. 4 is a view of the end of the feed-shaft and sliding box, the feed-roll being shown in section. Fig. 5 is a full cross-sectional view of Fig. 4 on line C D. Fig. 6 represents the sliding box in front elevation. Fig. 7 represents the sliding box in side elevation. Fig. 8 is a front view of the trunnioned bearing.

To the upper surface of the pit 10 is fastened the bed-plate 11. The bed-plate is provided with the pedestal-boxes 12 and 13, adapted to receive the main shaft 14, and the log chute or hopper 15 is also supported on said bed-plate. The main shaft is provided with the face or cutting plate 16, the main driving-pulley 17, and the shaft-collars 18 and 19. The cutting-plate is provided with a set of cutters or knives, as 20. The chip deflecting or guiding hood 21, which is shown in dotted outline in Figs. 1, 2, and 3, is provided for the purpose of making the chips as they are cut fall into the pit, from which they may be removed in the usual manner, preferably by means of a blower or a belt conveyer.

The construction, arrangement, and mode of operation of such parts of the machine as I have described, including the pit, bed-plate, hood, log-chute, main shaft, and its attachments—namely, cutting-plate and driving-pulley—are substantially the same as in ordinary use in connection with several styles or makes of chippers.

The main feed-shaft 22 is mounted in the bearings 23 and 24, which are bolted to the bed-plate, and it is provided with the gear 25 and the pulley 26, which is driven by means of the belt 27 from the main shaft 14. The main feed-shaft is kept in its endwise position by means of the collars 28 and 29. The gear 25 is designed to mesh with and drive gear 30, which is fastened to the feed-roll shaft 31, by means of which the feed-roll shaft is driven. Bearing 23, which is shown in elevation in Fig. 8, is mounted on the bed-plate and forms a bearing-support for the trunnion 32, which has two arms 33 and 34, which are supported, respectively, in the two members of said bearing 23. The arm 34 is provided with a bore 35, which constitutes a bearing for one end of the main feed-shaft 22. The oscillating trunnion 32 also serves as a bearing for one end of the feed-roll shaft 31, which is held in its endwise position with relation to said trunnion by means of the collar 37 and the gear 30, that serves as a collar. This trunnioned-bearing construction permits the rise or fall of the feed-roll 38, which is fastened to the feed-roll shaft in the feeding of logs of varying diameters without interference with the driving of the feed-roll shaft, the trunnion 32, which is coaxial with the main feed-shaft 22, permitting such movement without causing the gears to come out of mesh.

To one side of the chute 15 is fastened the slide 39, adapted to receive the sliding box 40, in which is mounted one end of the feed-roll shaft. This sliding box is provided with the hook 41, to which may be hitched a fall and tackle (not shown) for the purpose of raising and lowering the feed-roll as logs of varying diameters are fed into the chute. The length of the slide is sufficient to permit such raising and lowering of the feed-roll as may be necessary.

The feed-roll is provided with a series of spurs, as shown in the drawings, particularly in Figs. 4 and 5, which are provided for the purpose of insuring a steady progressive feed of the logs to the cutting-knives. In operation these spurs partially embed themselves in the log, thereby holding the log firmly and surely as it is fed up to and against the cutting-plate.

The operation of the chipper is as follows: The cutting-plate is driven by means of belt-power conveyed to the main driving-pulley in the direction indicated by an arrow in Fig. 2. A log placed in the chute under the feed-roll, which may be raised, if necessary, to admit the log, will be fed to the knives in a steady manner by the feed-roll up to and against the cutting-plate. The chute is usually so constructed and located that the bottom line of the trough is at an angle, as shown in the drawings, of about forty-five degrees with the vertical face-line of the cutting-plate. This angularity of the chute insures the cutting of the chips from the log in an oblique direction as to the length of the log. Therefore each chip will be the shape of a cylindrical ungula and each chip will be of the same thickness, which, as the knives are usually set, will be about five-eighths of an inch, thereby insuring a minimum wastage of stock and a nearly-constant length of fiber, to obtain which is essential in the economical production of first-class paper-pulp.

Under normal conditions the feed of the feeding mechanism is positive; but under abnormal conditions, such as are likely to exist at times, any forced irregularity of feed is compensated for by the slippage of the belt that drives the main feed-shaft. This is an important feature that tends to prevent accidents, especially to the machine itself.

What I claim as new, and desire to secure by Letters Patent, is—

1. A pulp-wood chipper provided with a feeding device consisting of a belt-driven main feed-shaft, and a gear-driven feed-roll shaft provided with a feed-roll and a trunnioned bearing adjacent to the gearing whereby the feed-roll may be raised or lowered without interference with the driving of the feed-roll shaft.

2. A pulp-wood chipper provided with the belt-driven main feed-shaft; the gear-driven feed-roll shaft, having the feed-roll, the trunnioned bearing to retain the gears in mesh and permit lateral movement of the feed-roll shaft, and the sliding box; and the slide, adapted to receive the sliding box.

In testimony whereof I have signed my name to this specification in the presence of two subscribing witnesses.

ALVIN O. LOMBARD.

Witnesses:
ARDELL A. DALEY,
DANIEL J. DALEY.